United States Patent [19]
Rule et al.

[11] Patent Number: 5,232,802
[45] Date of Patent: Aug. 3, 1993

[54] ELECTRON-TRANSPORT LIQUID CRYSTALLINE POLYMERIC COMPOUNDS, ELECTROPHOTOGRAPHIC ELEMENTS COMPRISING SAME, AND ELECTROPHOTOGRAPHIC PROCESS

[75] Inventors: Norman G. Rule; Jiann H. Chen, both of Rochester, N.Y.

[73] Assignee: Eastman Kodak Company, Rochester, N.Y.

[21] Appl. No.: 813,143

[22] Filed: Dec. 23, 1991

[51] Int. Cl.$^5$ .......................................... G03G 5/047
[52] U.S. Cl. ............................................. 430/59
[58] Field of Search ...................... 430/58, 59, 60, 62, 430/64

[56] References Cited

U.S. PATENT DOCUMENTS

| | | | |
|---|---|---|---|
| 4,657,694 | 4/1987 | Heeger et al. | 252/299.01 |
| 4,769,448 | 9/1988 | Heeger et al. | 534/804 |
| 4,894,263 | 1/1990 | Dubois et al. | 428/1 |
| 5,039,773 | 8/1991 | Sacripante et al. | 525/439 |

FOREIGN PATENT DOCUMENTS 234460  9/1988  Japan .

OTHER PUBLICATIONS

H. Finkelmann et al., *Makromol. Chem.*, 1978, 179, pp. 273-276; Model Considerations and Examples and Enantiotropic Liquid Crystalline Polymers.

L. L. Chapoy et al., *Macromolecules*, 1983, 16, pp. 181-185; A Helical Poly(amino acid) Having Carbazole Side Chains: A Candidate for a Photoelectric Liquid Crystal: Synthesis and Characterization.

H. Ringsdorf et al., *Makromol. Chem.*, 1984, 185, pp. 1327-1334; Electro-optical effects of azo dye containing liquid crystalline copolymers.

H. Ringsdorf et al., *Makromol. Chem.*, 1987, 188, pp. 1355-1366; Synthesis and characterization of liquid-crystalline copolymers with dichroic dyes and mesogens as side groups.

H. Fineklmann, *Angew. Chem. Int. Ed. Engl.*, 1987, 26, pp. 816-824; Liquid Crystalline Polymers.

*Primary Examiner*—John Goodrow
*Attorney, Agent, or Firm*—Nixon, Hargrave, Devans and Doyle

[57] ABSTRACT

Disclosed are electron-transport polymeric liquid crystalline compounds having the formula (I)

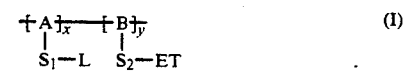

wherein
A and B are alkylsubstituted siloxane or acrylate repeating units;
$S_1$ and $S_2$ are alkylene spacer groups;
L is a mesogenic group;
ET is an electron-transport functionality; and
x and y are integers, the ratio of x to y is from about 100 to about 0.1, the sum of x and y is from about 5 to about 100.

Multi-active and single active electrophotographic elements comprising these compounds and electrophotographic processes are also disclosed.

15 Claims, No Drawings

ELECTRON-TRANSPORT LIQUID CRYSTALLINE POLYMERIC COMPOUNDS, ELECTROPHOTOGRAPHIC ELEMENTS COMPRISING SAME, AND ELECTROPHOTOGRAPHIC PROCESS

FIELD OF THE INVENTION

This invention relates to novel electron-transport polymeric compounds, electrophotographic elements comprising such electron-transport compounds and to an electrophotographic process employing such elements.

BACKGROUND OF THE INVENTION

Electrophotographic imaging processes have been extensively described in both the patent and other literature, for example in U.S. Pat. Nos. 4,514,481; 4,471,039; and 4,175,960 (and patents cited therein). Generally, these processes have in common the steps of electrostatically charging an electrophotographic element and exposing the element imagewise to electromagnetic radiation, thereby forming an electrostatic charge image. A variety of subsequent operations, well known in the art, can then be employed to produce a permanent record of the image.

Electrophotographic elements comprise a conducting support bearing a layer of a photoconductive material which is insulating in the dark but which becomes conductive upon exposure to activating radiation. A common technique for forming images with such elements is to uniformly electrostatically charge the surface of the element and then imagewise expose it to activating radiation. Upon exposure of an electrostatically charged electrophotographic element, electron-hole pairs are formed in the electrophotographic layer of the element. When the element is electrostatically charged with a negative potential, the hole migrates to the surface of the element, thereby dissipating the surface charge in the exposed areas. When the electrophotographic element is charged with a positive potential, the electron migrates toward the surface of the element, thereby dissipating the surface charge imagewise in the exposed areas.

Left behind is a charge pattern referred to as a latent electrostatic image, which can then be developed, either on the surface on which it is formed, or on another surface to which it has been transferred, by application of a liquid or dry developer composition which contains finely divided electroscopic marking particles, known as toner particles. These particles are either selectively attracted to and deposited in the charged areas, or are repelled by the charged areas and selectively deposited in the uncharged areas. The pattern of marking particles can be fixed to the surface on which they are deposited or it can be transferred to another surface and fixed there.

Electrophotographic elements can comprise a single active layer, containing the photoconductive material, or they can comprise multiple active layers. Elements with multiple active layers (sometimes referred to as multi-active elements) have at least one charge-generation layer and at least one charge-transport layer. The charge-generation layer responds to activating radiation by generating separated electron-hole pairs, one member of which pair (the one of opposite sign to the surface charge) migrates to the surface as a result of the attraction of the surface charge, and there neutralizes that charge. A latent electrostatic image is thus produced on the surface. The remaining member of the electron-hole pair goes to ground. Multi-active elements are extensively described in U.S. Pat. No. 4,175,960, which is hereby incorporated by reference.

Numerous photoconductive materials have been described as being useful in electrophotography. These include inorganic materials, the best known of which are selenium and zinc oxide, as well as monomeric and polymeric organic materials, such as arylamines, arylmethanes, azoles, carbazoles, pyrroles, phthalocyanines, polyvinylcarbazoles, and the like.

Typically, monomeric charge-transport materials have been incorporated in an electrophotographic element in solid solution in a polymer binder matrix. Alternatively, amorphous polymeric charge-transport materials have been used. In either case, the individual molecules of the charge-transport material are randomly oriented, which limits the mobilities of the charges and thus the speed with which the charges reach the surface of the element.

As described by Gray (G. W. Gray, ed., "Thermotropic Liquid Crystals" in *Critical Reports on Applied Chemistry*, Vol. 22, Wiley, 1987, p.x), liquid crystalline compounds can be divided into two general classes: lyotropic liquid crystals, which are ordered arrangements of micelles that arise in solutions of amphiphilic compounds at intermediate concentrations; and thermotropic liquid crystals, which are formed from rigid molecules, usually organic and generally either rod-shaped or disc-shaped, either by heating the crystalline solid or cooling the isotropic liquid.

As reported by H. Finkelmann et al. (*Makromol. Chem.*, 1978, 179, pp. 273-276), the mesomorphic properties of low molecular weight liquid crystalline compounds are also observed in macromolecules; polymeric materials that contain rigid mesogenic groups attached by flexible spacer groups to backbones generally do not crystallize at lower temperatures but exhibit glass transition temperatures at which liquid crystalline phases are formed.

L. L. Chapoy et al. (*Macromolecules*, 1983, 16, pp. 181-185) proposed that electronic transport phenomena such as photoconductivity could be enhanced if the active groups were contained in a polymer possessing long-range molecular order and, with this in mind, prepared a polylysine helical polymer containing carbazole substituents. It was reported that no thermotropic liquid crystalline behavior was observed with this material but that in concentrated solution it formed a cholesteric lyotropic mesophase.

There is a need for photoconductive materials that exhibit improved charge-carrier mobility. The present invention provides novel electron-transport compounds with highly ordered molecular structures.

SUMMARY OF THE INVENTION

The present invention relates to novel electron-transport polymeric compounds, as well as electrophotographic elements incorporating these compounds. In accordance with the invention, it has been found that liquid crystalline polymers incorporating covalently attached electron-transport functionalities can be used as the photoconductive charge-transport materials in electrophotographic elements.

Specifically, the electron-transport compounds of the invention have the formula (I)

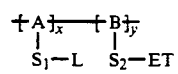
(I)

wherein A and B are alkylsubstituted siloxane or acrylate repeating units; S₁ and S₂ are alkylene spacer groups; L is a mesogenic group which imparts thermotropic liquid crystalline character to the compound; and ET represents an electron-transport functionality. Elements comprising the novel liquid crystalline polymers of the invention exhibit improved charge mobility as the result of the compounds' high degree of molecular orientation.

DETAILED DESCRIPTION OF THE INVENTION

As described above, the novel polymeric liquid crystalline electron-transport compounds of the invention have the formula (I):

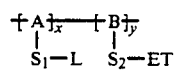
(I)

wherein
A and B are repeating units and are either alkylsubstituted siloxane units or are independently acrylate or methacrylate units;

S₁ and S₂ are alkylene groups which function as spacers;

L is a mesogenic group which imparts thermotropic liquid crystalline character to the compound;

ET is a group which renders the compound effective in transporting electrons to the surface of an electrophotographic layer; and x and y are integers, the ratio of x to y is form about 100 to about 0.1, preferably from about 10 to about 1, and the sum of x and y is from about 5 to about 100, preferably from about 10 to about 80.

L is a rigid rod-shaped group such as a substituted biphenyl, phenylcyclohexane, cyclohexylcyclohexane, stilbene, or any of the structural types shown in Table 1 of "Liquid Crystalline Polymers" (H. Finkelmann, *Angew. Chem. Int. Ed. English*, 1987, 26, pp. 816–824). In a preferred embodiment, L is a substituted phenyl benzoate. In a more preferred embodiment, L is a 4-cyanophenyl 4'oxybenzoate.

In a preferred embodiment, novel electron-transport compounds according to the invention have the formula (II) or (III):

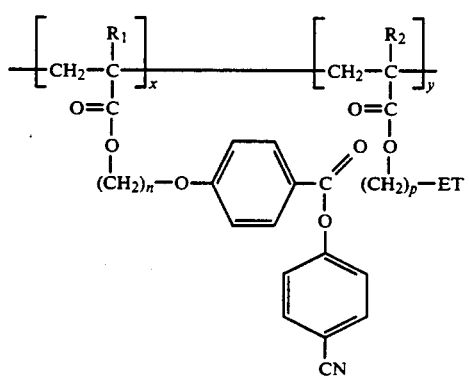
(II)

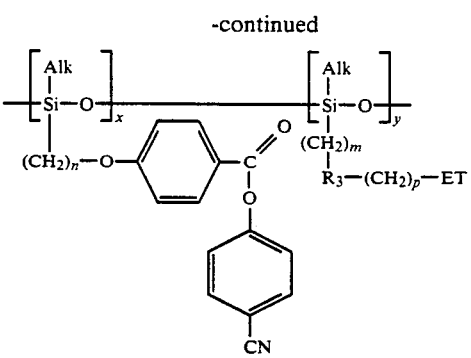
(III)

wherein
R₁ and R₂ are independently hydrogen atoms or methyl groups;
R₃ is —OCO— or —COO—;
Alk is lower alkyl of 1 to 4 carbon atoms;
n is an integer from 2 to 20;
m is an integer from 2 to 12; and
p is an integer from 0 to 6.

Groups for ET include radicals derived by removing a hydrogen atom from the n-type organic transport materials listed in U.S. Pat. No. 4,701,396, from col. 12, line 40 through col. 13, line 6, the disclosures of which are hereby incorporated by reference. Preferred groups for ET include

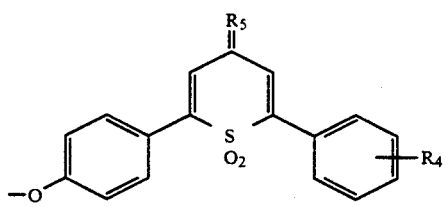
(IV)

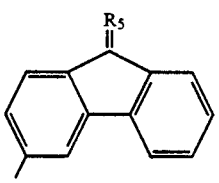
(V)

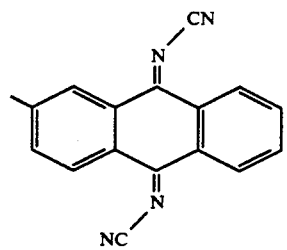
(VI)

wherein
R₄ is selected from the group consisting of m-methyl, p-methyl, m-chloro, p-chloro, m-trifluoromethyl, p-trifluoromethyl, p-ethyl, and p-isopropyl groups; and R₅ is selected from the group consisting of

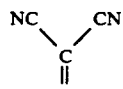
(VII)

-continued
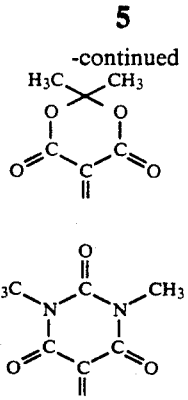
(VIII)
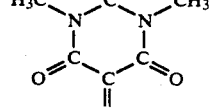
(IX)
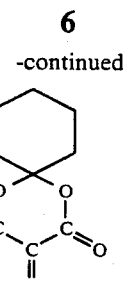
(X)
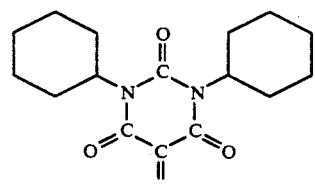
(XI)
Especially preferred electron-transport polymeric liquid crystalline compounds according to the invention include
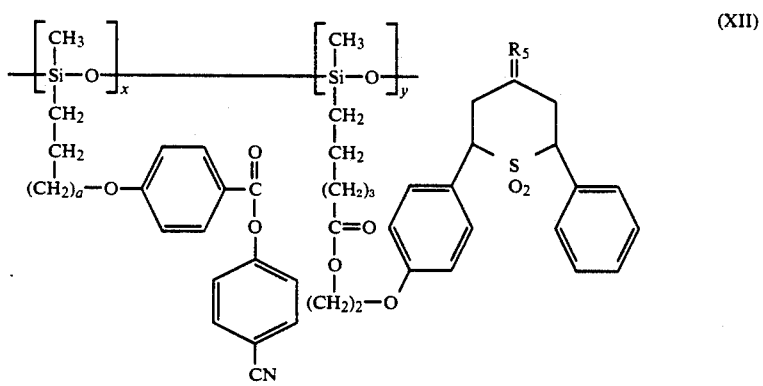
(XII)
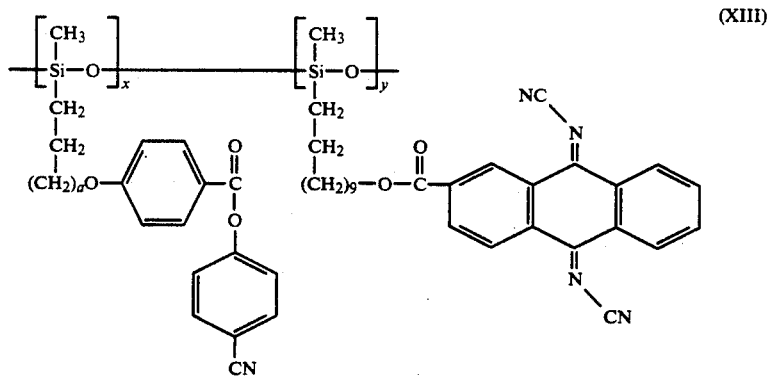
(XIII)
wherein a is an integer from 1 to 9, and

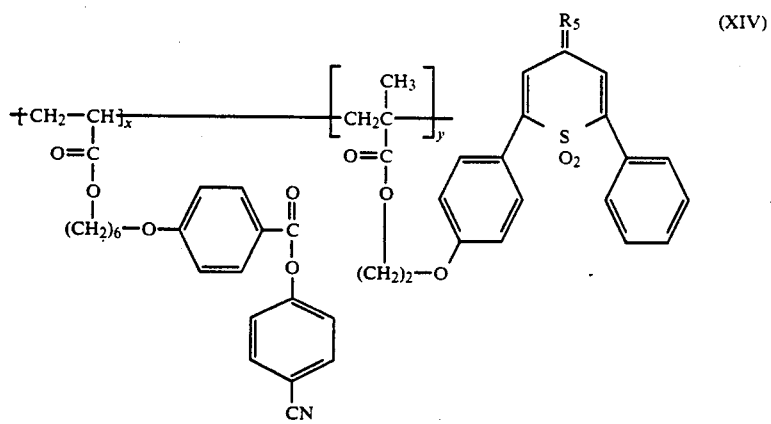

An electrophotographic element in accordance with the invention comprises a charge-generation material and a charge-transport material coated on an electrically conductive support. The charge-transport material comprises a polymeric liquid crystalline compound having the formula (I)

wherein A, B, $S_1$, $S_2$, L, ET, x and y are as described above. Preferred groups for ET and preferred liquid crystalline compounds are described above by formulas (II) through (XIV).

The novel electron-transport polymeric liquid crystalline compounds of the invention are useful in either single-active or multi-active electrophotographic elements, as those are described above. In a single-active electrophotographic element, the charge-generation material and charge-transport material are contained in a single electrophotographic layer, which layer is in electrical contact with a conductive support. A multi-active electrophotographic layer, in contrast, comprises separate charge-generation and charge-transport layers, either of which is in electrical contact with the support.

Most charge-transport materials preferentially accept and transport either positive charges (holes) or negative charges (electrons), although there are materials known which will transport both positive and negative charges. Transport materials which exhibit a preference for conduction of positive charge carriers are referred to as hole-transport (or p-type transport) agents, whereas those which exhibit a preference for the conduction of negative charges are referred to as electron transport (or n-type) agents. The novel compounds of the present invention are electron-transport or n-type agents with highly ordered molecular structures.

A multi-active electrophotographic element in accordance with the invention may be either a "standard" or an "inverse composite" element. By a "standard" element, we mean an element having a charge-generation layer in electrical contact with the conductive support. A charge-transport layer is coated over the charge-generation layer, forming the top surface of the element. In an "inverse composite" element, the charge-generation layer is on the top surface of the element, with the charge-transport layer beneath it, in electrical contact with the support.

In an electrophotographic imaging process, a uniform electrostatic charge is applied to the surface of the electrophotographic element. This electrostatic charge is held at or near the surface of the element due to the insulating properties of the element in the absence of activating radiation.

The term "activating radiation" as used in the present specification is defined as electromagnetic radiation which is capable of generating electron-hole pairs in the charge-generation material of the element. When the charge-generation material is exposed to such activating radiation, electron-hole pairs are photogenerated therein. As described in U.S. Pat. No. 4,175,960, multiple modes of operation are possible with an electrophotographic element, depending on whether the element is subjected to an initial uniform positive electrostatic charge or to an initial uniform negative electrostatic charge, whether the element is a standard or inverse composite element, as described above, and whether positively charged or negatively charged toner and developer compositions are desired to be used.

It is a distinct advantage of the present invention that the charge-transport layer of a multi-active electrophotographic element can consist entirely or essentially entirely of the novel liquid crystalline charge-transport compounds of the invention. A charge-transport layer of a multi-active electrophotographic element in accordance with the invention can be free of any nonphotoconducting polymeric binder. Alternatively, as is more usually the case with conventional charge-transport materials, the charge-transport layer can contain a mixture of the charge-transport material in a suitable film-forming polymeric binder material. The binder material, if it is an electrically insulating material, helps to provide the charge-transport layer with electrical insulating characteristics, and it also serves as a film-forming material useful in (a) coating the charge-transport layer, (b) bonding the charge-transport layer to an adjacent substrate, and (c) providing a smooth, wear-resistant surface. Of course, even in instances where the charge-transport material can be conveniently applied without a separate binder, for example, where the charge-transport material is itself a polymeric material, such as the novel compounds of the present invention, the use of a polymeric binder may enhance desirable physical properties such as adhesion, resistance to cracking, etc.

Where a polymeric binder material is employed in the charge-transport layer, the optimum ratio of charge-transport material to binder material can vary widely depending on the particular polymeric binder(s) and particular charge-transport material(s) employed. In general, it has been found that, when a binder material is employed, useful results are obtained wherein the amount of active charge-transport material contained within the charge-transport layer varies within the range of from about 5 to about 90 weight percent based on the dry weight of the charge-transport layer.

Representative materials which can be employed as binders in the charge-transport layer are film-forming polymeric materials having a fairly high dielectric strength and good electrically insulating properties. Such binders include styrene-butadiene copolymers; vinyltoluene-styrene copolymers; styrene-alkyd resins; silicone-alkyd resins; soya-alkyd resins; vinylidene chloride-vinyl chloride copolymers; poly(vinylidene chloride); vinylidene chloride-acrylonitrile copolymers; vinyl acetate-vinyl chloride copolymers; poly(vinyl acetals), such as poly(vinyl butyral); nitrated polystyrene; polymethylstyrene; isobutylene polymers; polyesters, such as poly[ethylene-co-alkylenebis (alkyleneoxyaryl) phenylenedicarboxylate]; phenol-formaldehyde resins; ketone resins; polyamides; polycarbonates, polythiocarbonates; poly[ethylene-co-isopropylidene-2,2-bis(ethyleneoxy-phenylene) terephthalate]; copolymers of vinyl haloarylates and vinyl acetate such as poly(vinyl m-bromobenzoate- co-vinyl acetate); chlorinated poly(olefins), such as chlorinated poly(ethylene); etc. Methods of making resins of this type have been described in the prior art, for example, styrene-alkyd resins can be prepared according to the method described in U.S. Pat. Nos. 2,361,019 and 2,258,423. Suitable resins of the type contemplated for use in the charge transport layers of the invention are sold under such tradenames as VITEL PE 101 TM, CYMAC TM, Piccopale 100 TM, Saran F-220 TM, and LEXAN 145 TM. Other types of binders which can be used in charge transport layers include such materials as paraffin, as well as combinations of binder materials.

In general, it has been found that polymers containing aromatic or heterocyclic groups are most effective as binder materials for the charge-transport layers because these polymers, by virtue of their heterocyclic or aromatic groups, tend to provide little or no interference with the transport of charge carriers through the layer.

The charge-transport layer can also contain other addenda such as leveling agents, surfactants, plasticizers, and the like to enhance or improve various physical properties of the charge-transport layer. In addition, various addenda to modify the electrophotographic response of the element may be incorporated in the charge-transport layer. For example, various contrast control materials, such as those described in *Research Disclosure*, Volume 122, June, 1974, p. 33, "Additives for Contrast Control in Organic Photoconductor Compositions and Elements," can be incorporated in the charge-transport layer.

The thickness of the charge-transport layer can vary. It is especially advantageous to use a charge-transport layer which is thicker than that of the charge-generation layer, with best results generally being obtained when the charge-transport layer is from about 5 to about 200 times, and particularly 10 to 40 times, as thick as the charge-generation layer. A useful thickness for the charge-generation layer is within the range of from about 0.1 to about 15 $\mu$m dry thickness, particularly from about 0.5 to about 2 $\mu$m. However satisfactory results can also be obtained using a charge-transport layer which is thinner than the charge-generation layer.

The charge-transport layers described herein are typically applied to the desired substrate by coating a liquid dispersion or solution containing the charge-transport layer components. Typically, the liquid coating vehicle used is an organic solvent. Typical solvents include (1) Aromatic hydrocarbons such as benzene and substituted aromatic hydrocarbons such as toluene, xylene and mesitylene;

(2) Ketones such as acetone and 2-butanone;

(3) Halogenated aliphatic hydrocarbons such as methylene chloride, chloroform and ethylene chloride;

(4) Ethers including cyclic ethers such as tetrahydrofuran and ethyl ether;

(5) Mixtures of the above.

The charge-generation material of the present invention can comprise any of a number of materials known in the art that are capable, upon exposure to activating radiation, of generating and injecting charge carriers into the charge-transport material. Charge generation materials include inorganic materials such as amorphous selenium, zinc oxide, cadmium selenide, and arsenic triselenide, as disclosed in U.S. Pat. No. 4,108,657; phthalocyanine pigments, as disclosed in U.S. Pat. Nos. 4,578,334 and 4,701,396; the perylene compound disclosed in U.S. Pat. No. 4,716,163; and the aggregate photoconductors which are dyebinder cocrystalline complexes formed with pyrylium-type sensitizing dyes and binder polymers of the types disclosed in U.S. Pat. Nos. 3,615,396, 3,615,414, 3,615,415 and 3,732,180.

A variety of electrically conducting supports in the form of sheets, drums or endless belts can be employed in the elements of this invention, such as for example, paper (at a relative humidity above 20 percent); aluminum-paper laminates; metal foils such as aluminum foil, zinc foil, etc.; metal plates such as aluminum, copper, zinc, brass and galvanized plates; vapor deposited metal layers such as silver, chromium, nickel, aluminum and the like coated on paper or conventional photographic film bases such as poly(ethylene terephthalate), cellulose acetate, etc. Such conducting materials as chromium or nickel can be vacuum deposited on transparent film supports in sufficiently thin layers to allow electrophotographic elements prepared therewith to be exposed from either side. An especially useful conducting support can be prepared by coating a support material such as poly(ethylene terephthalate) with a conducting layer containing a semiconductor dispersed in a resin. Such conducting layers, both with and without electrical barrier layers, are described in U.S. Pat. No. 3,245,833.

The various layers of the element can be coated directly on the conducting substrate. In some cases, it may be desirable to use one or more intermediate subbing layers over the conducting substrate to improve adhesion between the conducting substrate and overlying layers or to act as an electrical barrier layer as described in U.S. Pat. No. 2,940,348. Such subbing layers, if used, typically have a dry thickness in the range of about 0.01 to about 5 $\mu$m. Typical subbing layer materials include film-forming polymers such as cellulose nitrate, polyesters, copolymers such as copolymer of vinylpyrrolidone and vinyl acetate, and various vinylidene chloride-containing polymers including two, three and four component polymers prepared from a polymerizable blend of monomers or prepolymers containing at least 60 percent by weight of vinylidene chloride Representative vinylidene chloride-containing polymers include vinylidene chloride-methyl methacrylate-itaconic acid terpolymers as disclosed in U.S. Pat. No. 3,143,421. Various vinylidene chloride-containing hydrosol polymers which may be used include tetrapolymers of vinylidene chloride, methyl acrylate, acrylonitrile and acrylic acid as disclosed in U.S. Pat. No. 3,640,708. Other useful vinylidene chloride-containing copolymers include poly(vinylidene chloride-methyl acrylate), poly(vinylidene chloride-methacrylonitrile), poly(vinylidene chloride-acrylonitrile), and poly(vinylidene chloride-acrylonitrile-methyl acrylate). Other subbing materials include the so-called tergels described in U.S. Pat. No. 3,228,770.

Optional overcoat layers can also be used if desired. For example, to improve surface hardness and resistance to abrasion, the surface of the element of the invention can be coated with one or more electrically insulating, organic polymer coatings or electrically insulating, inorganic coatings. Useful overcoats are described for example, in Research Disclosure, "Electrophotographic Elements, Materials and Processes," Vol. 109, p. 63, paragraph V, May 1973.

While the novel photoconductive elements are useful in electrophotography, they can also be used in other arts, such as in solar cells, where photoconductive elements are employed.

The novel liquid crystalline compounds of the invention are prepared by copolymerization of a charge-transport monomer with a mesogenic, or liquid crystal-forming, monomer. We have found that a surprisingly high percentage of the charge-transport monomer can be incorporated into the compounds of the invention while retaining the overall liquid crystalline character.

The mesogenic vinyl monomers, of which compound (XV) (4-cyanophenyl 4-(ω-undecylenyloxy)benzoate) is representative, were prepared by the method of H. Ringsdorf et al., Makromol. Chem., Rapid Commun. 1982, 3, 557–562.

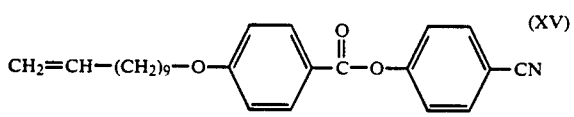

The mesogenic acrylate monomers, of which compound (XV) (4-cyanophenyl 4-(6-acryloyloxyhexyloxy)benzoate) is representive, were prepared essentially by the method of M. Portugall et al., Makromol. Chem. 1982, 183, 2311–2321.

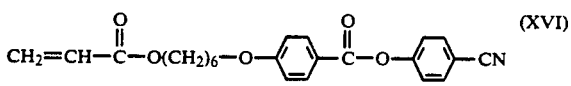

The following examples illustrate the preparation of the novel liquid crystalline compounds by copolymerization of starting monomers, and the retention of the liquid crystalline character of the compounds. Example 1 illustrates the preparation of the charge-transport monomers, and Example 2 illustrates the copolymerization of the mesogenic and charge-tranport monomers to form the novel compounds of the invention.

EXAMPLE 1

Preparation of 4-dicyanomethylene-2-(4-(2-methacryloyloxyethyloxy)phenyl)-6-phenyl-4H-thiopyran-1,1-dioxide (XVII)

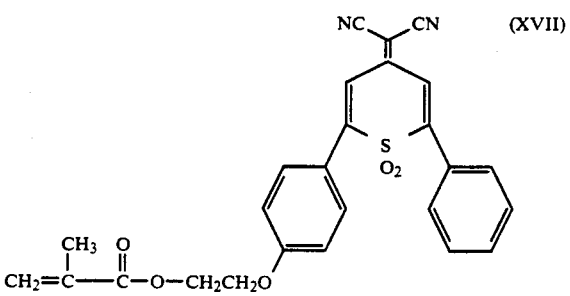

The alcohol (XVIII) was prepared essentially by the method of Scheme 1, U.S. Pat. No. 4,968,813, where the R substituent of the starting benzaldehyde is —OCH$_2$CH$_2$OH.

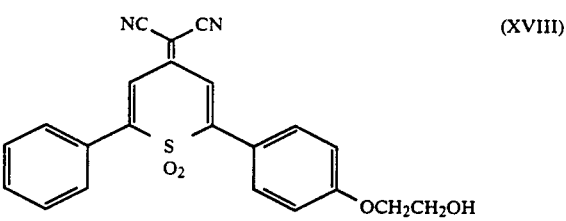

To a mixture of 2.40 g of the alcohol (XVIII) and 2 ml triethylamine in 40 ml dry tetrahydrofuran contained in a stoppered flask was added dropwise 2 ml methacryloyl chloride. The mixture was allowed to stand overnight, then poured into an excess of dilute hydrochloric acid. The organic precipitate was extracted into dichloromethane. The dichloromethane layer was separated, dried over MgSO$_4$, and filtered. The solvent was evaporated under reduced pressure, and the residue was flash chromatographed by the method of Still et al. (J. Org. Chem. 43, 2923 (1978)). The column was eluted with toluene containing 8 ml ethyl acetate per liter. Fractions were examined by thin-layer chromatography on silica plates, using 20% ethyl acetate in toluene as eluent. The homogeneous fractions were combined and the solvent was evaporated under reduced pressure. The solid residue was recrystallized from methanol/methyl acetate until HPLC showed it was of high purity. The identity of the product was confirmed by mass spectrometry and $^1$H NMR.

EXAMPLE 2

Preparation of poly[6-(4-(4-cyanophenoxy-carbonyl)phenoxy)hexylacrylate-co-4-dicyano-methylene-2-(4-(2-methacryloyloxyethoxy)phenyl)-6-phenyl-4H-thiopyran-1,1-dioxide](XIX)

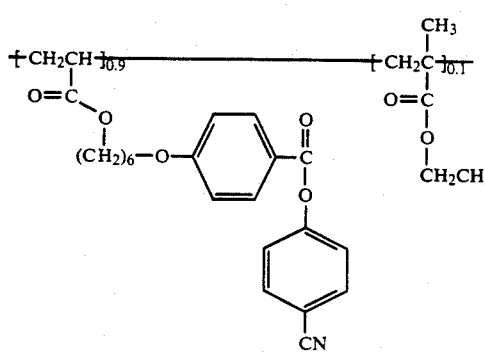

(XIX)

4-Dicyanomethylene-2-(4-(2-methacryloyloxy-ethoxy)phenyl)-6-phenyl-4H-thiopyran-1,1-dioxide, $0.27 \times 10^{-3}$ mole, and 4-cyanophenyl 4-(6-acryloyloxyhexyloxy)-benzoate, $2.5 \times 10^{-3}$ mole, were dissolved in 20 ml of toluene and polymerized under nitrogen at 70° C. for 48 hours. Azoisobutyronitrile, 20 mg, was added as an initiator. The polymer was precipitated into cold ether, redissolved in dichloromethane, and re-precipitated into ether. This procedure was repeated until the monomer was no longer detectable in the wash solvent by thin-layer chromatography. The purified polymer was dried under reduced pressure, and characterized by $^1$H NMR, polarization microscopy, differential scanning calorimetry, gel pemeation chromatography, and cyclic voltammetry. The results for two liquid crystalline polymers prepared by the method of Example 2 are summarized in Table 1.

TABLE 1

| Sample | Initial Conc. of electron-transport monomer (mole %) | Conc. of electron-transport portion in product (mole %) | Phase Transition (°C.)* | WJ/g (heat enthalpy) | Mw*** | Mn**** | Redox Potential |
|---|---|---|---|---|---|---|---|
| 1 | 10% | 5% | $G_{27}N_{55}I$** | 3.47 | 4400 | 1810 | −210 mV |
| 2 | 20% | 10% | $G_{26.3}N_{67}I$ | 4.77 | 4560 | 2040 | −212 mV |

*Determinied by differential scanning calorimetry
**G, N, and I represent the glass transition temperature and the nematic and isotropic phases, respectively.
***Weight-average molecular weight.
****Number average molecular weight.

The invention has been described in detail with particular reference to preferred embodiments thereof, but it will be understood that variations and modifications can be effected within the spirit and scope of the invention.

We claim:

1. An electrophotographic element, comprising a photoconductive material that includes a charge generation material and a charge-transport material, coated on an electrically conductive support, wherein said photoconductive material is insulating in the dark but becomes conductive upon exposure to activating electromagnetic radiation, and wherein said charge-transport material comprises a polymeric liquid crystalline compound having the formula (I)

wherein
A and B are repeating units and are either alkylsubstituted siloxane units, or are independently acrylate or methacrylate;
$S_1$ and $S_2$ are alkylene groups which function as spacers;
L is a mesogenic group which imparts thermotropic liquid crystalline character to the compound;
ET is a group which renders the compound effective in transporting electrons to the surface of an electrophotographic layer; and
x and y are integers, the ratio of x to y is from about 100 to about 0.1, and the sum of x and y is from about 5 to about 100.

2. The element of claim 1 wherein said polymeric liquid crystalline compound has the formula (II) or the formula (III)

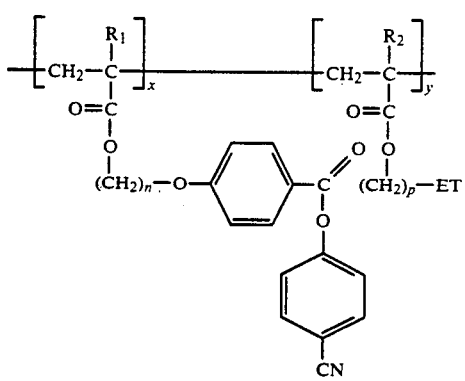
(II)

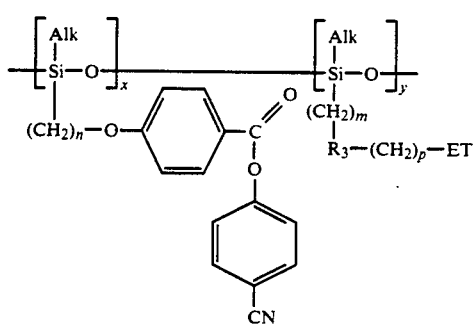
(III)

wherein

R₁ and R₂ are independently hydrogen atoms, or methyl groups;

R₃ is —OCO— or —COO—;

Alk is lower alkyl of 1 to 4 carbon atoms;

n is an integer from 2 to 20;

m is an integer from 2 to 12; and p is an integer from 0 to 6.

3. The element of claim 1 wherein ET is selected from the group consisting of

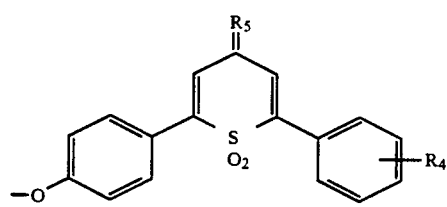
(IV)

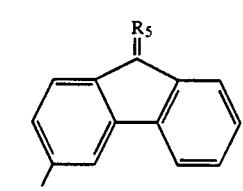
(V)

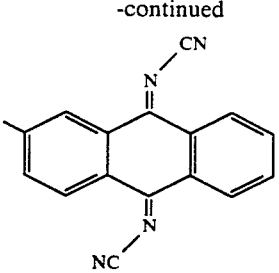
(VI)

wherein

R₄ is selected from the group consisting of m-methyl, p-methyl, m-chloro, p-chloro, m-trifluoromethyl, p-trifluoromethyl, p-ethyl, and p-isopropyl groups; and R₅ is selected from the group consisting of

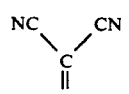
(VII)

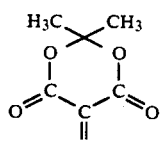
(VIII)

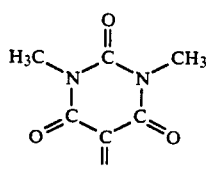
(IX)

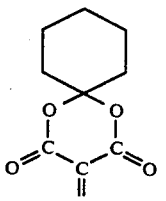
(X)

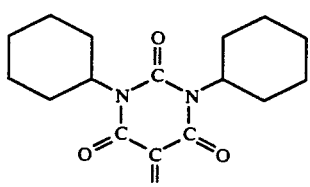
(XI)

4. The element of claim 1 wherein said polymeric liquid crystalline compound is selected from the group consisting of

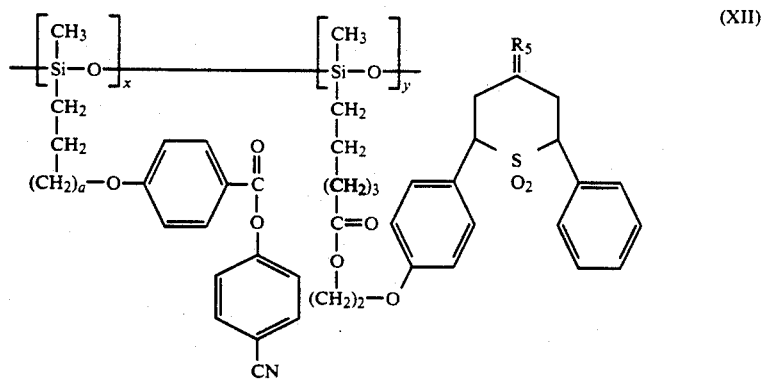

(XII)

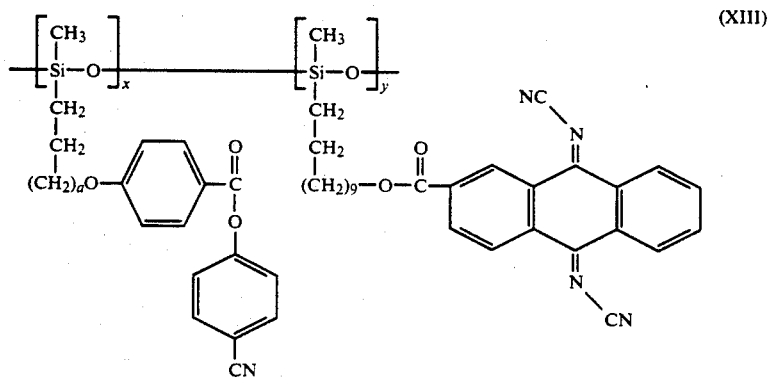

(XIII)

wherein a is an integer from 1 to 9, and

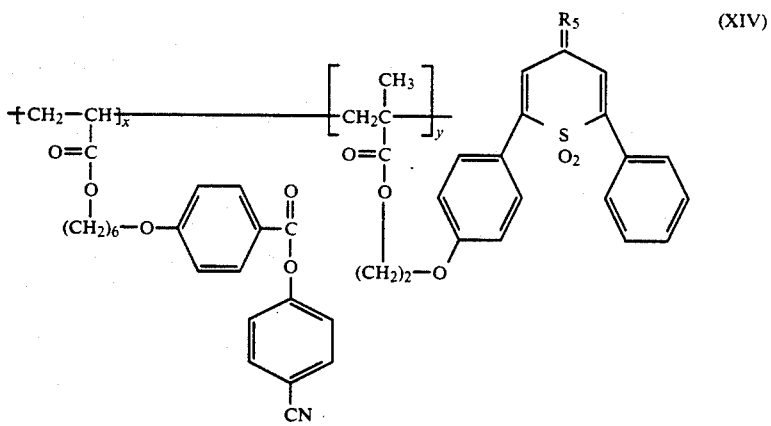

(XIV)

5. The element of claim 1, wherein said charge-generation material and said charge-transport material are contained in separate charge-generation and charge-transport layers, either of which is in electrical contact with said support.

6. The element of claim 2, wherein said charge-generation material and said charge-transport material are contained in separate charge-generation and charge-transport layers, either of which is in electrical contact with said support.

7. The element of claim 3, wherein said charge-generation material and said charge-transport material are contained in separate charge-generation and charge-transport layers, either of which is in electrical contact with said support.

8. The element of claim 4, wherein said charge-generation material and said charge-transport material are contained in separate charge-generation and charge-transport layers, either of which is in electrical contact with said support.

9. The element of claim 1, wherein said charge-generation material and said charge-transport material are contained in a single active layer, which layer is in electrical contact with said support.

10. The element of claim 2, wherein said charge-generation material and said charge-transport material are contained in a single active layer, which layer is in electrical contact with said support.

11. The element of claim 3, wherein said charge-generation material and said charge-transport material are contained in a single active layer, which layer is in electrical contact with said support.

12. The element of claim 4, wherein said charge-generation material and said charge-transport material are contained in a single active layer, which layer is in electrical contact with said support.

13. The element of claim 5, wherein said charge-transport layer is free of non-photoconductive polymeric binder.

14. An electrophotographic imaging process, comprising charging the surface of an electrophotographic element, said element comprising a photoconductive material that includes a charge-generation material and a charge-transport material coated on an electrically conductive support, wherein said photoconductive material is insulating in the dark but becomes conductive upon exposure to activating electromagnetic radiation, and wherein said charge-transport material comprises a polymeric liquid crystalline compound having the formula (I)

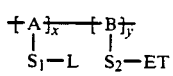  (I)

wherein

A and B are repeating units and are either alkylsubstituted siloxane or are independently acrylate or methacrylate units;

$S_1$ and $S_2$ are alkylene groups which function as spacers;

L is a mesogenic group which imparts thermotropic liquid crystalline character to the compound;

ET is a group which renders the compound effective in transporting electrons to the surface of an electrophotographic layer; and x and y are integers, the ratio of x to y is from about 100 to about 0.1, and the sum of x and y is from about 5 to about 100;

exposing the element to activating radiation; and developing the charged and exposed element by applying charge toner particles to said element to produce a toned image.

15. The process of claim 14, wherein the polymeric liquid crystalline compound has the formula (II) or (III)

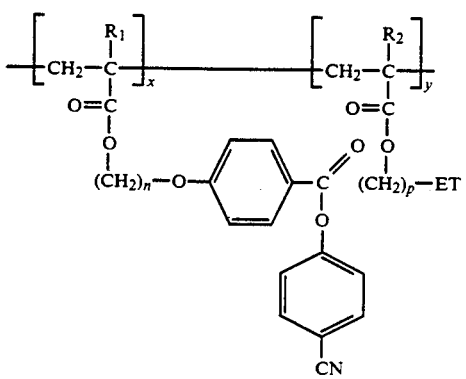  (II)

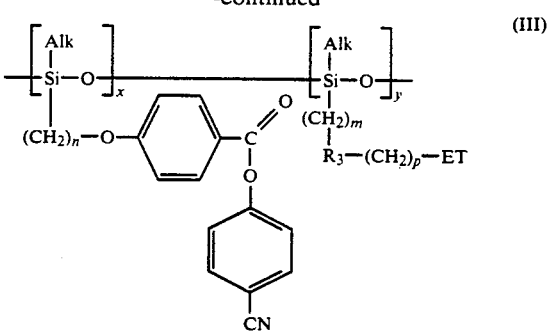  (III)

where
$R_1$ and $R_2$ are independently hydrogen atoms or methyl groups;
$R_3$ is —OCO— or —COO—;
Alk is lower alkyl of 1 to 4 carbon atoms;
ET is selected from the group consisting of

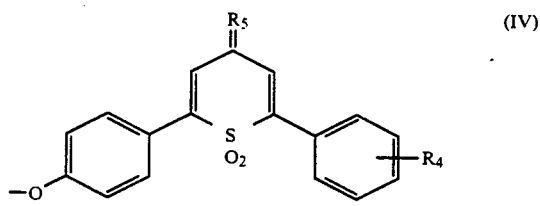  (IV)

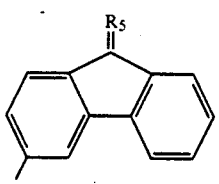  (V)

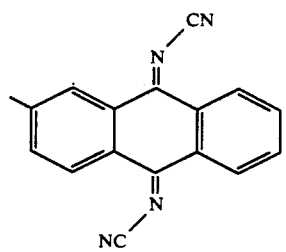  (VI)

wherein
$R_4$ is selected from the group consisting of m-methyl, p-methyl, m-chloro, p-chloro, m-trifluoromethyl, p-trifluoromethyl, p-ethyl, and p-isopropyl groups; and
$R_5$ is selected from the group consisting of

  (VII)

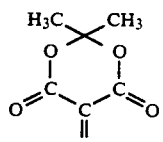  (VIII)

-continued
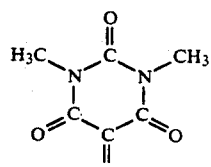
(IX)
-continued
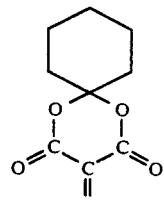
(X)
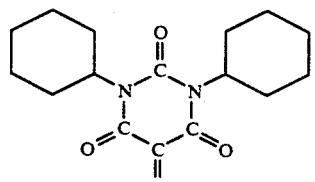
(XI)
n is an integer from 2 to 20;
m is an integer from 2 to 12; and
p is an integer from 0 to 6.
* * * * *